United States Patent
Rahman

(10) Patent No.: US 6,928,569 B2
(45) Date of Patent: Aug. 9, 2005

(54) AUTOMATIC OUTPUT DELAY TIMING ADJUSTMENT FOR PROGRAMMABLE GLITCH FILTER

(75) Inventor: Mohammad Jahidur Rahman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 581 days.

(21) Appl. No.: 10/199,261

(22) Filed: Jul. 19, 2002

(65) Prior Publication Data

US 2004/0015734 A1 Jan. 22, 2004

(51) Int. Cl.$^7$ ................................................ H04L 7/00
(52) U.S. Cl. ....................................... 713/400; 713/401
(58) Field of Search .................... 714/800, 41; 713/400, 713/41; 235/492

(56) References Cited

U.S. PATENT DOCUMENTS

| | | | | |
|---|---|---|---|---|
| 5,968,180 A | * | 10/1999 | Baco | 713/400 |
| 6,098,888 A | * | 8/2000 | Praden | 235/492 |
| 6,513,719 B1 | * | 2/2003 | Imura | 235/492 |
| 6,631,481 B1 | * | 10/2003 | Hoard et al. | 714/41 |

* cited by examiner

Primary Examiner—Thomas Lee
Assistant Examiner—Ji H. Bae
(74) Attorney, Agent, or Firm—J. Dennis Moore; W. James Brady, III; Frederick J. Telecky, Jr.

(57) ABSTRACT

A method for application in a data interface controller receiving asynchronous input data at predetermined one of a plurality of input bit frequencies, wherein the input data is sampled by the interface controller at a sample rate greater than the predetermined input bit rate, and wherein the sample rate is variable, and wherein the interface controller provides output data corresponding to the input data, but delayed by a delay amount that varies in accordance with the sample rate. The method is for providing a responsive signal event, responsive to a reference event in the delayed input data and at a predetermined time relative to an input bit time. In the method, a reference timing number is stored, representing the predetermined time in periods of the predetermined input bit frequency. An adjustment number corresponding to the delay amount is determined, in periods of the predetermined input bit frequency. The adjustment number is subtracted from the reference timing value to determine an adjusted timing number. A reference event is detected in the delayed input data, and in response thereto an adjusted timing number of periods of the predetermined input bit frequency is counted. A responsive signal event is provided at the time when the counting has ended.

5 Claims, 5 Drawing Sheets

AUTOMATIC OUTPUT DELAY TIMING ADJUSTMENT FOR PROGRAMMABLE GLITCH FILTER

TECHNICAL FIELD OF THE INVENTION

This invention relates to asynchronous data communication interface controllers, and more particularly relates to a method and apparatus for automatically adjusting an output delay for such controllers, where the timing of sampling is adjusted during operation.

BACKGROUND OF THE INVENTION

In asynchronous transmission, data is coded into a series of pulses, including a start bit, and including a stop bit or a guard band. The start bit is sent by a sending unit to inform a receiving unit that a character is to be sent. The character is then sent, followed by the stop bit or guard band, designating that the transfer of that bit is complete. Modes of asynchronous communication are frequently defined in standards that are established by standards setting bodies, such as the American National Standards Institute (ANSI), the International Telecommunications Union (ITU) and the International Organization for Standardization (ISO).

Asynchronous communication is frequently used to transfer data to and from plug-in units, such as modems, memory cards, and the like, that are plugged into host units, such as digital cameras, personal computers, and the like. An interface controller in the host unit manages the asynchronous data communication between the plug-in unit and the host unit. An exemplary asynchronous communication standard is the ISO7816 standard, adopted by the ISO. Plug-in units communicating with an interface controller in a manner that complies with the ISO7816 standard are frequently referred to as Smart Cards, or Integrated Circuit Cards.

FIG. 1 shows a typical Smart Card interface arrangement. A Smart Card unit 10 is electrically connected to a host unit 14 by way of an interface controller 12 in the host unit 14 that manages the transfer of data between the Smart Card unit 10 and the host unit 14. The transfer of data between the host unit 14 and the interface controller 12 is shown by way of example in FIG. 1 as being by way of a PCI bus 16 in the host unit 14. Numerous other means for communicating data between the interface controller and the host unit are possible, including EISA bus, universal serial bus (USB), and so on. The Smart Card connection to the host unit 14 is by way of a two-way serial line 11, which is split in the host unit 14 into a transmitting line 26 and a receiving line 30, using well known techniques. The rate of data exchange between the Smart Card unit 10 and the interface controller 12 is controlled by an interface clock, which can be at one of five different clock frequencies, 4 MHz, 6 MHz, 8 MHz, 12 MHz and 20 MHz.

The interface unit 12 includes a Smart Card interface subunit 18 and a PCI interface subunit 20. The Smart Card interface subunit 18 includes a Smart Card block 22 and a parity checker block 24. The Smart Card block 22 receives the signals transmitted on line 26 by the Smart Card unit 10, recovers the data in those signals, and then sends that data on line 27 to the PCI interface subunit where it is placed on the PCI bus 16 according to the well-known PCI standard protocol, for transmission to other parts (not shown) of the host unit 14. The parity checker block 24 monitors the data on line 26 to detect whether a parity error exists in a character of data. If such a parity error is so detected, the parity checker block 24 asserts a signal on line 28, which causes a gate 29 to block the Smart Card block 22 from receiving the error, and sends a signal on line 30 to the Smart Card unit 10 notifying it of the error, which prompts an attempted re-send of the affected character from the Smart Card unit 10. Further details on this and other aspects of the ISO7816 standard can be found in the ISO7816 standard publication, which may be obtained from the International Organization for Standardization at 1, rue de Varembé, Case postale 56, CH-1211 Geneva 20, Switzerland. A basic overview of the ISO7816 standard may be obtained from the Smart Card Industry Association at 191 Clarksville Road, Princeton Junction, N.J. 08550.

FIG. 2 is a timing diagram for a signal that is compliant with the ISO7816 standard, with time represented on the horizontal axis. A complete character is shown in the figure, starting at time 0 and ending at time tn. The character is composed of bits, each bit being of a defined duration referred to in the ISO7816 standard as an Elementary Time Unit, or etu. At any given time the signal is at either an A state or a Z state. At the beginning of a character, between time 0 and time t1, a start bit having a value of A is sent, followed by eight data bits between time t1 and time t9. The eight data bits are followed, between time t9 and t10, by a parity bit. The parity bit is followed by a guard time having a variable number of etus duration, between time t10 and the end of the character, time tn. The delay between two consecutive characters is at least 12 etu, including a character duration (10+/−0.2 etu), plus the guard time.

Referring again to FIG. 1, the parity checker block 24 monitors the data detected by the Smart Card block 22 to detect whether a parity error exists in a character of data. If such a parity error is so detected, the parity checker block 24 sends a signal on line 30 to the Smart Card unit 10 notifying it of the error, which prompts an attempted re-send of the affected character from the Smart Card unit 10. The detection of a parity error is also signaled in the data stream generated on line 27. Referring now to FIG. 9, the ISO7816 standard specifies that when a parity error is detected, during the guard time starting at 10.5+/−0.2 etu the receiver transmits an error signal at state A for 1 etu minimum and 2 etu maximum.

However, a problem exists in the above and similar arrangements in that the rate at which the signals are sampled in the interface unit 12 may be varied during operation, and a sampling delay introduced to the data. For example, referring again to the arrangement shown in FIG. 1, sometimes parity errors are detected in the parity checker block 24 because of the occurrence of glitches occurring on the signals sent from the Smart Card unit 10. In order to be able to be able to successfully detect the data in asynchronous communication, even if glitches are present, and also to avoid the time expenditure involved in parity error detecting and signaling, and re-send of data, it may be desirable to implement a glitch filter, for example of the type described in co-pending U.S. patent application Ser. No. (TI-34197). In that application, a glitch filter is implemented in which the width of glitches is determined, and a sample rate for the asynchronous data is varied, depending on the glitch width. However, the glitch filter introduces a sampling delay to the data. This delay shifts the assertion of the error signal, so that it may not be asserted within the specified time, i.e., beginning at 10.5+/−0.2 etu.

To avoid the delay, the parity checker in the Smart Card unit could be modified to sample the data before the glitch filter. However, this approach could result in a significant number of unnecessary parity errors being reported during operation of the Smart Card.

This problem is not limited to asynchronous data communicated according to the ISO7816 standard, but is a problem with respect to asynchronous data communication generally, wherein a specified signal must be asserted in a character of detected asynchronous data, and a variable delay is introduced in the sampling of the data. It would be desirable to be able to be able to vary the delay in the sampling of the data, while still being able to assert such specified signal at the proper time.

SUMMARY OF THE INVENTION

In accordance with the present invention, a method is provided for application in a data interface controller receiving asynchronous input data at predetermined one of a plurality of input bit frequencies, wherein the input data is sampled by the interface controller at a sample rate greater than the predetermined input bit rate, and wherein the sample rate is variable, and wherein the interface controller provides output data corresponding to the input data, but delayed by a delay amount that varies in accordance with the sample rate. The method is for providing a responsive signal event, responsive to a reference event in the delayed input data and at a predetermined time relative to an input bit time. In the method, a reference timing number is stored, representing the predetermined time in periods of the predetermined input bit frequency. An adjustment number corresponding to the delay amount is determined, in periods of the predetermined input bit frequency. The adjustment number is subtracted from the reference timing value to determine an adjusted timing number. A reference event is detected in the delayed input data, and in response thereto an adjusted timing number of periods of the predetermined input bit frequency is counted. A responsive signal event is provided at the time when the counting has ended.

These and other features of the invention will be apparent to those skilled in the art from the following detailed description of the invention, taken together with the accompanying drawings.

DETAILED DESCRIPTION OF THE PREFERRED EMBODIMENT

The numerous innovative teachings of the present invention will be described with particular reference to the presently preferred exemplary embodiments. However, it should be understood that this class of embodiments provides only a few examples of the many advantageous uses and innovative teachings herein. For example, while the embodiment of the invention described herein is with respect to an ISO7816 standard data interface, it is applicable to any asynchronous data interface. In general, statements made in the specification of the present application do not necessarily delimit the invention, as set forth in different aspects in the various claims appended hereto. Moreover, some statements may apply to some inventive aspects, but not to others.

In order to better understand the preferred embodiments of the present invention, in which the output signal delay is adjusted to avoid the above-described problems, a detailed understanding of an embodiment of the programmable glitch filter described in the above-mentioned co-pending U.S. patent application Ser. No. (TI-34197) is helpful, and so will now be presented.

Figure 2:
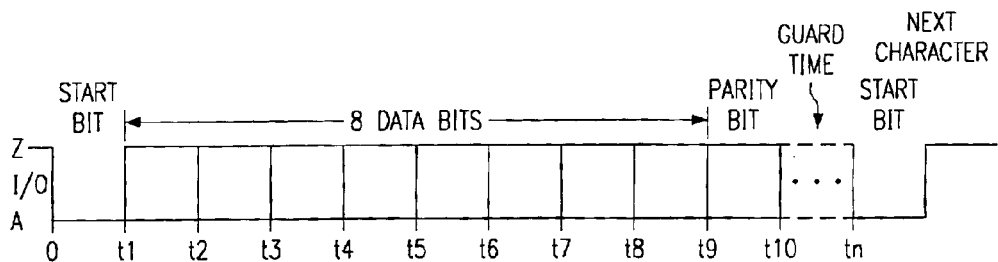
FIG. 2 is a signal timing diagram for a signal complying with the ISO7816 standard.
Figure 3:
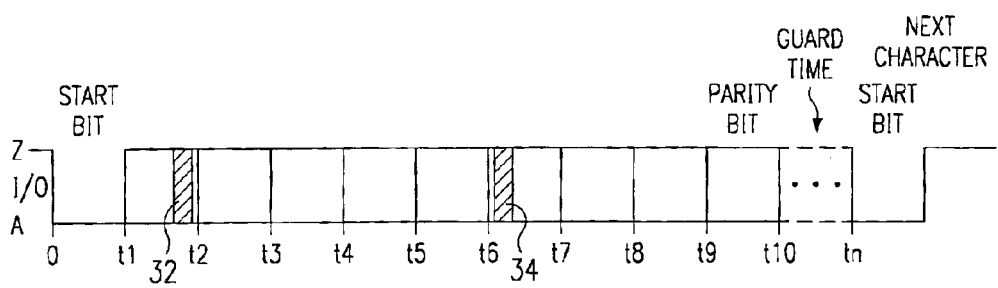
FIG. 3 is a signal timing diagram like that of FIG. 2, and also showing the presence of glitches.

FIG. 3 is a signal timing diagram like that of FIG. 2, but also showing two glitches, at 32 and 34, that appear in the first and sixth data bits, respectively. These glitches take the form of a signal superimposed on the transmitted signal, having a voltage opposite from that of the data bit. Thus, for example, if the first data bit in FIG. 3 has a value of Z, the glitch would be a negative-going pulse that would cause a detector to see a value of A during the glitch. Likewise, if such first data bit has a value of A, the glitch would be a positive-going pulse that would cause a detector to see a value of Z during the glitch.

Glitches are typically less than 0.2 bits in duration. However, if the glitch exists at the time the Smart Card block 22 attempts to resolve the value of the bit, an erroneous detection of the bit value occurs. Generally, there is seldom more than one glitch in a given character, and so a parity error is usually generated by the glitch. Worse, however, if two glitches occur in a given character, no parity error is generated, since the two glitches cancel for the purposes of parity, but corrupted data is transmitted to the host unit.

Figure 1:
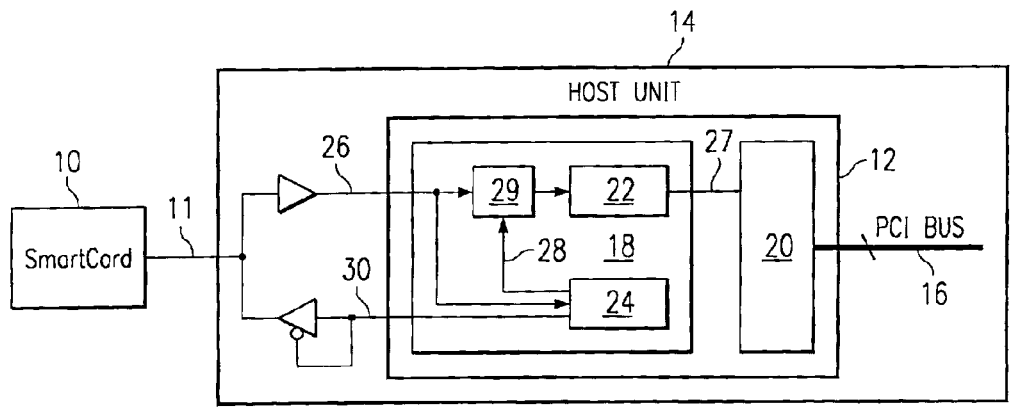
FIG. 1 is a block diagram of a prior art Smart Card-to-PCI bus interface arrangement.
Figure 4:
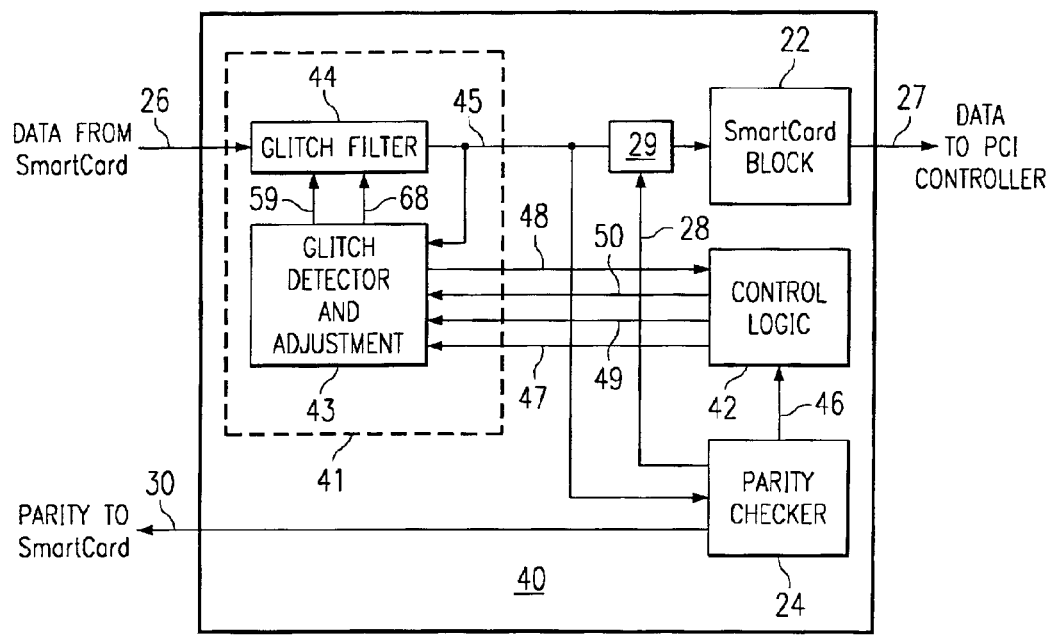
FIG. 4 is a block diagram of a Smart Card interface unit incorporating a programmable glitch filter.

FIG. 4 is a block diagram of a Smart Card interface subunit 40 incorporating the above-mentioned embodiment of a programmable glitch filter 41, a gate 29, a Smart Card block 22, a parity checker block 24, and a control logic block 42. The gate 29, the Smart Card block 22 and the parity checker block 24 may be the same as the same numbered blocks of FIG. 1. The programmable glitch filter 41 and control logic block 42 may be implemented in hardware, firmware or software, as desired.

The programmable glitch filter (PGF) 41 is comprised of a glitch detector and adjustment block (GDA) 43 and a glitch filter 44, interconnected, and connected to logic block 42, Smart Card block 22 and parity checker block 24, as shown. The PGF 41 is generally initialized in an Off state, although it may be programmed to be initialized in an On state. In the Off state, the glitch filter 44 receives signals from a Smart Card unit, provided to the PGF 41 on line 26, and samples those signals at a reference clock rate, for example a system clock rate at 48 MHz, to recover the Smart Card signals. The recovered Smart Card signals are sent to the Smart Card block 22 and to the parity checker block 24 on line 45. As in the prior art, if the parity checker block 24 detects an error, it sends a blocking signal on line 28 to the gate 29, and sends a signal on line 30 to the Smart Card unit. The parity checker block 24 also sends a signal on line 46 to control logic 42, indicating that a parity error has been detected. This can be the same signal as that sent on line 30, inverted if required.

Briefly, after the control logic 42 detects a programmable number of parity errors, it sends a signal on line 47 to the GDA 43, which enables the finding of glitches. The GDA 43 is programmed to detect glitches having a width less than 0.2 etu. When the GDA 43 detects a glitch, it provides a signal to the control logic on line 48. Once the control logic 42 receives this signal, it causes a newly calculated glitch width to be stored, and turns on the glitch filter 44 by asserting an enable bit on line 68. The newly calculated glitch width is provided to the glitch filter 44 on line 59, where it is used to set the sample clock at a frequency that optimizes glitch filtering, described in detail below.

In this way, glitches are detected, and the width of the latest detected glitch is used to set the sample clock, thus providing advantageous adaptive glitch detection and filtering, maximizing the detecting and filtering of glitches in an environment where glitch widths may be varying over time. The operation of PGF 41 is described in detail below.

Figure 5:
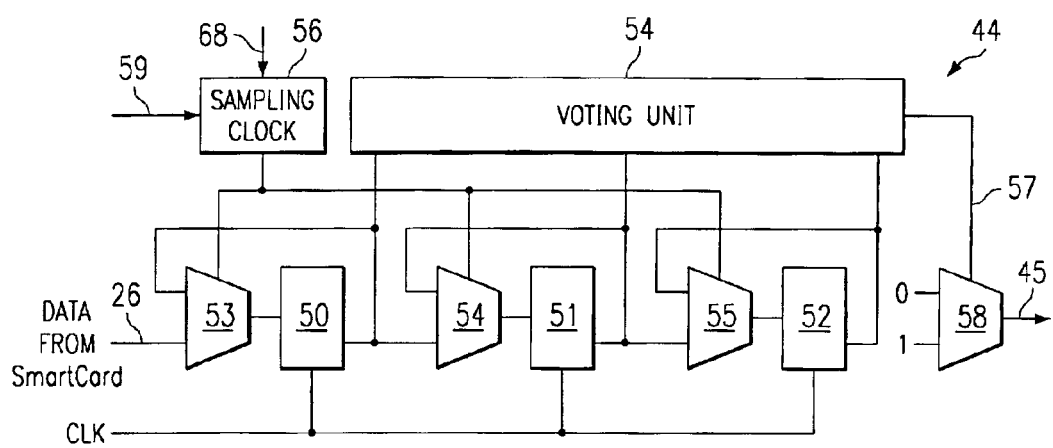
FIG. 5 is a block diagram of the glitch filter block of FIG. 4.

FIG. 5 shows a detailed diagram of the glitch filter 44. A three-bit shift register is provided, comprising, for example, three latches 50, 51, 52, connected in series, as shown. Three two-input multiplexers 53, 54, 55, are also provided in series with the multiplexers 53, 54, 55, for a data hold function described in detail below. The data from a Smart Card on line 26 is provided to one input of multiplexer (MUX) 53. The output of MUX 53 is provided to the data input of latch 50. The output of latch 50 is provided to one input of MUX 54, as well as to the other input of MUX 53, and to a first input of a three-input voting unit 54. Likewise, the output of MUX 54 is provided to the data input of latch 51, and the output of latch 51 is provided to one input of MUX 55, as well as to the other input of MUX 54, and to a second input of three-input voting unit 54. The output of MUX 55 is provided to the data input of latch 52, and the output of latch 52 is provided to the other input of MUX 55, and to a third input of three-input voting unit 54.

The output of a sampling clock generator 56 is provided to the control input of MUXes 53, 54 and 55. Each of latches 50, 51 and 52, of the three-bit shift register is clocked by a reference clock, which in this embodiment is a system clock, CLK, e.g., at 48 MHz. A results output of voting unit 54 is provided to the control input of a MUX 58 on line 57. The two inputs of MUX 58 are held to a 0 and to a 1, respectively. The output of MUX 58 is provided to line 45.

Note that while the latches 50, 51 and 52, are clocked by the system clock CLK, the MUXes 53, 54 and 55, are strobed by the output of sampling clock generator 56. Thus, the contents of the latches 50, 51 and 52, is controlled by the sampling clock generator 56, since the contents of each latch is simply circulated, i.e., held, unless a sample clock is asserted. The sampling clock generator 56 receives an input on line 59 from the GDA 43 (FIG. 4), while the voting unit 54 receives an enable signal on line 68 from the GDA 43.

The voting unit 54 is an unclocked block of logic that provides an output that is the result of a two-out-of-three "vote," i.e., according to the following Table 1:

TABLE 1

| Input Values | Output Value |
|---|---|
| 0, 0, 0 | 0 |
| 1, 0, 0 | 0 |
| 0, 1, 0 | 0 |
| 0, 0, 1 | 0 |
| 1, 1, 0 | 1 |
| 0, 1, 1 | 1 |
| 1, 0, 1 | 1 |
| 1, 1, 1 | 1 |

In operation, when not enabled for glitch filtering, the sampling clock generator 56 is simply set to the CLK rate. This is controlled by the filter enable signal on line 68. Thus, when the filter enable signal is not asserted (i.e., signaling disable) the sampling clock generator 56 is forced to output the sampling clock at the CLK rate. In this mode, as the samples are sensed by the voting unit 54, it controls MUX 58 to provide a 0 or 1, thereby recovering the data from the signals on line 26. Any but extremely short glitches (<~50 picoseconds) will result in multiple samples, which will be sensed by the voting unit 54 and thus appear at the output of MUX 58, i.e, on line 45 in the recovered data.

However, when glitch filter 46 is enabled for glitch filtering, the latest glitch width setting is provided from the GDA 43 is provided on line 59, and stored in the sampling clock generator 56, and the enable signal is asserted on line 68. The sampling clock generator 56 provides the sampling clock to the control input of MUXes 53, 54 and 55, at a frequency corresponding to that stored value, as described below. The three latches 50, 51, 52, continue to be clocked at the CLK rate. However, as mentioned above, the MUXes 53, 54 and 55, are strobed at the sampling clock rate, and thus shift data samples in sequence through the latches 50, 51, 52, at that rate. The frequency of the sampling clock is set to optimize glitch filtering, for example corresponding to approximately the frequency of a square wave signal having a period equal to the width of the detected glitch. As a result, for glitches approximately the width of the detected glitch, or smaller, the data value represented by that glitch will appear at most in only one of the three latches 50, 51, 52, while the proper data value will appear in the other two latches.

The voting unit 54 outputs on line 57 a results value corresponding to the data value in at least two of the three latches 50, 51, 52, as described above. Thus, even if a glitch is propagated through the latches 50, 51, 52, the voting unit ignores it and controls MUX 58 to output the proper value. Note that a larger number of latches could be provided, and a majority vote taken on their outputs, but three latches is considered preferred. If a larger number of latches is used, the number is preferably odd, to ensure an unambiguous vote. Also note that the manner in which the sequential samples are stored for the voting process is a matter of design choice and is not limited to latches; it is only necessary to store them in some way so that they can be examined simultaneously for the voting process.

Figure 6:
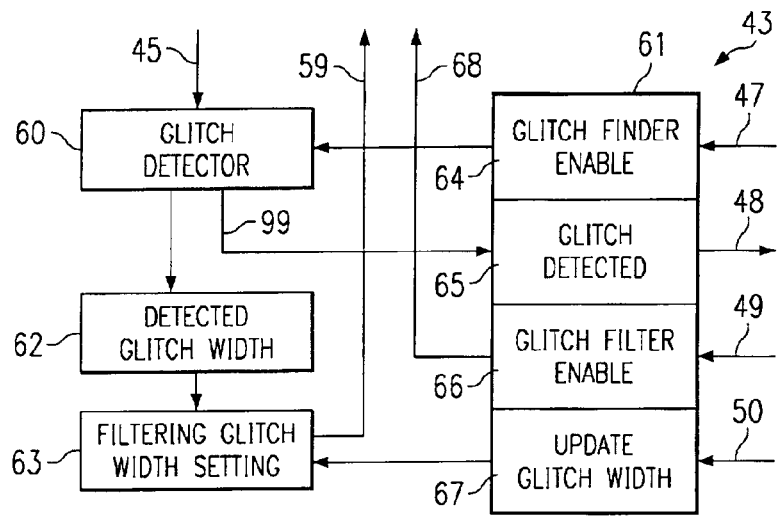
FIG. 6 is a block diagram of the glitch detector and adjustment block of FIG. 4.
Figure 7:
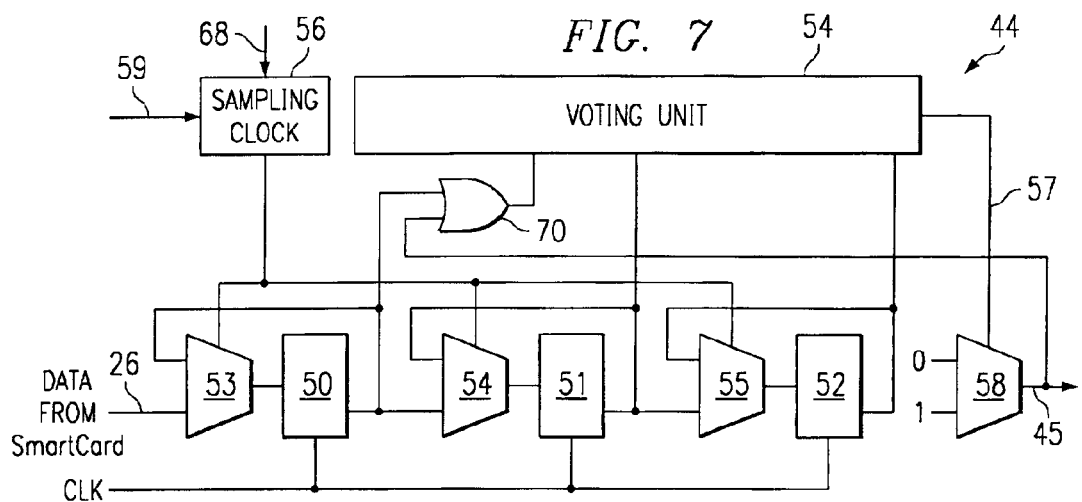
FIG. 7 is a block diagram of a glitch filter like that of FIG. 5, but also including an optional hysteresis function.

FIG. 6 is a block diagram of the GDA block 43 of FIG. 4. The GDA block 43 includes a glitch detector 60, a glitch control register block 61, a detected glitch width register 62, and a filtering glitch width setting register 63. The glitch control register block 61 includes a one-bit glitch finder enable register 64, a one-bit glitch detected register 65, a one-bit glitch filter enable register 66, and a one-bit update glitch width register 67. The glitch detector 60 receives the samples on line 45 from the glitch filter 44 (FIG. 5). When glitch detector 60 detects a glitch it sets the bit in glitch detected register 65 to a 1, using line 99, and stores a value corresponding to the width of the detected glitch in detected glitch width register 62. The value stored in the filtering glitch width setting register 63 is provided on line 59, for provision to the sampling clock generator 56 in the glitch filter 44. The glitch finder enable register 64 receives a glitch finder enable signal from control logic 42 (FIG. 4) on line 47. The glitch detected register 65 provides the bit value stored therein to control logic 42 on line 48. The glitch filter enable register 66 receives a glitch filter enable signal from control logic 42 on line 49. An update glitch width signal from control logic 42 on line 50.

In operation, after the control logic 42 detects a programmable number of parity errors, it sends a signal on line 47 to the GDA 43, setting the bit in the glitch finder enable register 64 to a 1, which enables the finding of glitches by glitch detector 60 in the signals provided on line 45. The GDA 43 is preferably programmed to detect glitches having a width less than 0.2 etu, although selection of the width is a matter of design choice. When the glitch detector 60 detects a glitch, it sets the bit in the glitch detected register 65 to a 1. At the same time, it calculates the glitch width by counting the number of interface clock periods between the beginning edge and ending edge of the glitch, and stores that calculated value in the detected glitch width register 62, overwriting any default value previously stored therein.

Figure 8:
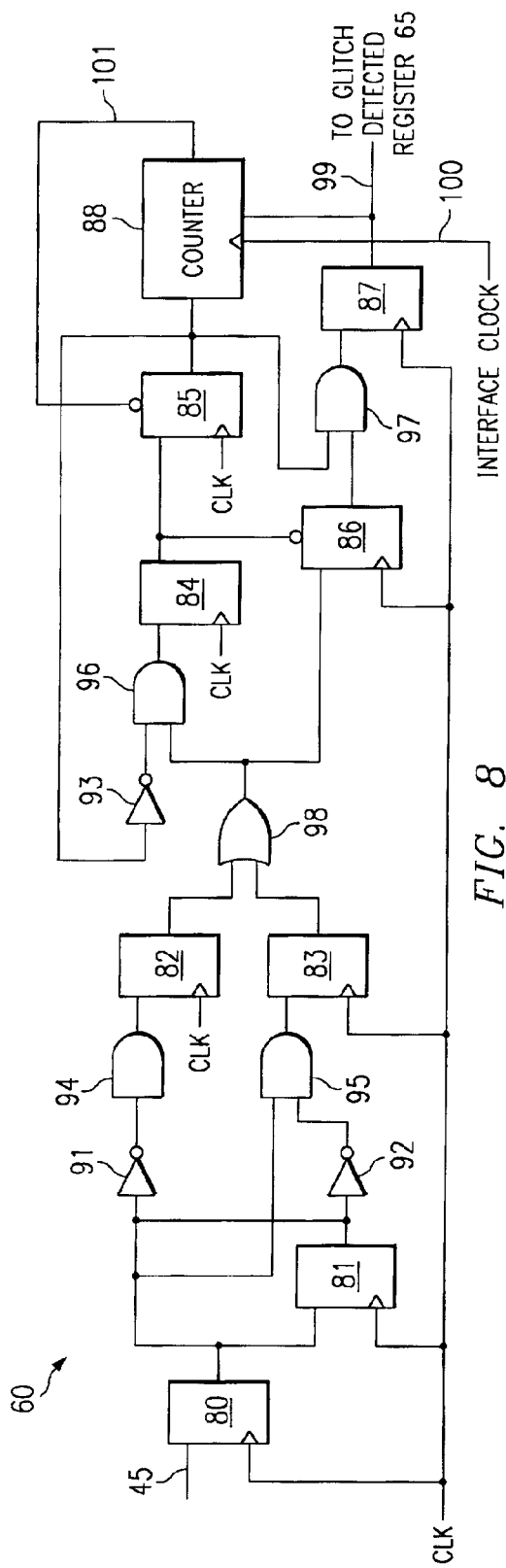
FIG. 8 is a block diagram of the glitch detector of FIG. 6.

FIG. 8 shows a preferred embodiment of glitch detector 60 in which the rising and falling edges of pulses on line 45 are detected, and a count is made of interface clock periods between them. It includes flip-flops 80–87, counter 88, inverters 91–93, AND gates 94–97, and OR gate 98, interconnected as shown. All of the flip-flops 80–87 are clocked by CLK, i.e., at 48 MHz, but the counter 88 counts at the interface clock rate. It will be recalled that the rate of data exchange between the Smart Card unit 10 and the interface controller 12 is controlled by an interface clock, which can be at one of five different clock frequencies, 4 MHz, 6 MHz, 8 MHz, 12 MHz and 20 MHz.

In operation, the output of flip-flop 82 goes to 1 when the glitch detector 60 detects a falling edge, e.g., the start of a negative glitch. On the other hand, the output of flip-flop 83 goes to a 1 when the glitch detector 60 detects a rising edge, e.g., the start of a positive glitch. The output of flip-flop 84 goes to a 1 when the first falling or rising edge is detected. This sets the output of flip-flop 85 to a 1, which starts the counter 88 counting interface clock periods. The output of flip-flop 86 is set to a 1 only when the end of a glitch, i.e., the second edge, is detected. This sets the output of flip-flop 87, i.e., line 99, to a 1, which causes the counter 88 to stop counting, and sets the bit in glitch detected register 65 (FIG. 6) to a 1. Counter 88 is 15 bits wide, which is sufficient to catch the glitches it is desired to detect. The value in the counter is the value in the detected glitch width register 62. Counter 88 may serve as the detected glitch width register 62, in which case the final count value, when line 99 goes to a 1, is read directly from it, or a separate register may be provided as the detected glitch width register, in which case the final count is loaded into the separate register. If counter 88 counts to its highest count, e.g., $2^{15}-1$, a signal is asserted on line 101, which is connected to the reset input of flip-flop 85, thus resetting flip-flop 85.

The value of the bit in glitch detected register 65 is provided to the control logic 42 on line 48. Once the control logic 42 reads the value of 1 on line 48 it clears the glitch detected register 65. At the same time, the control logic 42 sets the bit in the update glitch width register 67 to a 1, which causes the newly calculated glitch width to be read from glitch detected register 62, converted into system clock periods and stored in the filtering glitch width setting register 63. At the same time, the control logic 42 turns on the glitch filter 44 (FIG. 5) by setting the bit in the glitch filter enable register 66 to 1. The value in the glitch filter enable register 66 is provided to the glitch filter 44 on line 68, as described above.

It will be recalled that the value in the filtering glitch width setting register 63 is provided on line 59 to the glitch filter 44, where it is used to set the sample clock. The sample clock is derived from the system clock, and so the value stored in the filtering glitch width setting register is also in system clock periods in order to simplify the sample clock setting. To optimize glitch filtering, the frequency of the sampling clock is preferably set to the frequency of an oscillating signal having a period equal to the width of the detected glitch, i.e., the value in the filtering glitch width setting register 63. Basically:

$$F_s \leq 1/(P_{sys} \cdot W_d), \qquad \text{Equation (1)}$$

where $F_s$ is the sampling frequency, $P_{sys}$ is the period of one cycle of the system clock, and $W_d$ is the value in the filtering glitch width setting register 63, converted to system clock periods. The "less than or equal to" symbol is used in order to indicate that an optional guard time may be provided in setting the sampling frequency, in order to ensure that the sampling is optimized. Since the embodiment described herein updates the glitch width on an ongoing basis, providing a guard time is not considered necessary.

Preferably, an initial default value is provided in the detected glitch width register 62, of 2 μs. This is because it is believed that most glitches that are present on signals from Smart Cards are less than 2 μs wide. With such an initial default value, the control logic 42 could be programmed in a first mode, for example, to enable the glitch filter 44 by simply setting the bit in the glitch filter enable register 66 to a 1. There would then not be a need to set the bit in the glitch finder enable register 64 and then do the above-described calculations to find the glitch width. However, the control logic 42 could be programmed to switch to a second mode, in which the full operation, including glitch width calculation, all as described above, is followed, if the parity checker 24 continued to report more parity errors.

After detection of the first glitch, and the steps described above are taken, the glitch detector 60 continues to monitor the signals on line 45. Operation is the same as described above, only instead of overwriting an initial default value in the detected glitch width register 62, the previously calculated value is overwritten. Also, there is no need to re-set the bit in the glitch finder enable register 64.

Now, as mentioned above, the ISO7816 standard specifies that when a parity error is detected, during the guard time starting at 10.5+/−0.2 etu the receiver transmits an error signal at state A for 1 etu minimum and 2 etu maximum. However, the glitch filter described above has three MUXes 53, 54, 55 which are strobed at the sampling clock rate, and voting unit 54. This circuitry can cause a signal delay between its input and output of 2–3 times the delay in one of the MUXes 53, 54, 55, although the actual delay depends both on the sampling clock frequency and the position of the signal start on line 26.

Figure 9:
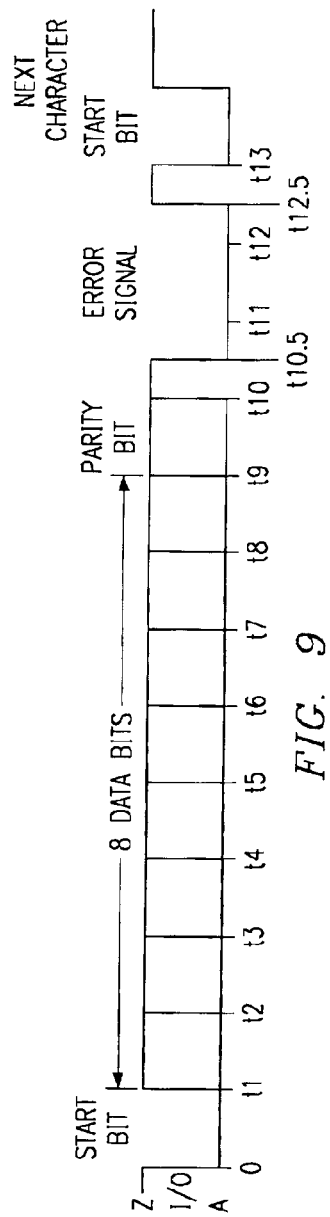
FIG. 9 is a signal timing diagram like that of FIG. 2, and showing an error signal during the guard time.
Figure 10:
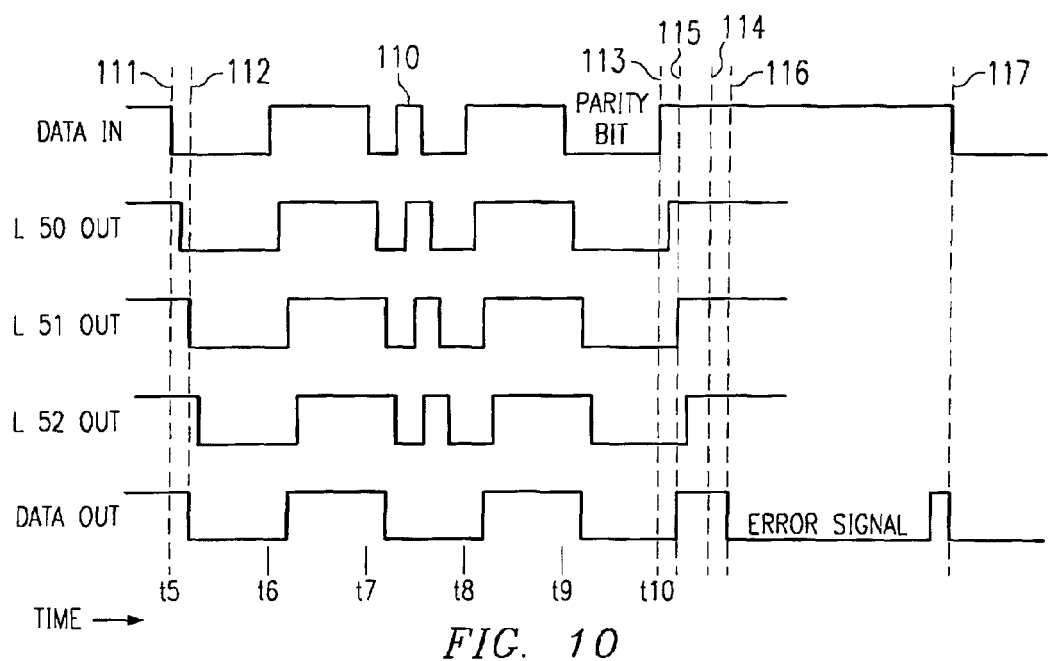
FIG. 10 is a signal timing diagram showing five representative signals that occur in the Smart Card interface unit of FIG. 4.

The problem can be seen more clearly by reference to FIG. 10, which shows five signals with respect to time. The top signal is Data In, the data input to the Smart Card interface subunit 40 on line 26. The next three signals below the data input signal are L50 Out, L51 Out and L52 Out, the outputs of the three latches, 50, 51, 52, respectively. The bottom signal, Data Out, is the output of the Smart Card interface subunit 40. The Data In signal is shown starting at time t5, using the time convention described above in connection with FIGS. 2, 3 and 9. Time t5 is also identified as time 111 in the figure. The beginning of the next character is shown as time 117. A glitch 110 can be seen in the seventh data bit, between times t7 and t8. The action of the glitch filter has eliminated the glitch, as can be seen in the Data Out signal.

As can be seen in FIG. 10, the start time of the seventh bit is delayed slightly by each of the MUXes 53, 54, 55, so that the Data Out signal accumulates an aggregate time delay equal to the difference between time 112 and time 111. It can be seen that this aggregate time delay is twice the delay in one of the MUXes. It might be thought that the delay should be three times the delay in one of the MUXes, but actually, since the voting unit 54 has its output determined by two out of its three inputs, as the samples at a transition from an old bit level to a new bit level are shifted through the shift register in the glitch filter 44, the output of the voting unit 54 changes state after only two samples at the new bit level are shifted into the shift register. This is taken into account in the preferred embodiment of the present invention in determining the appropriate delay before asserting the error signal, as discussed in detail below.

Now, as mentioned above, the ISO7816 standard specifies that when a parity error is detected, starting at 10.5+/−0.2 etu the receiver transmits an error signal. Time 10 etu is shown in FIG. 10 as line 113, while time 10.5 etu is shown in the figure as line 114. However, the end of the parity bit in the Data Out signal, shown by line 115, has been delayed by the glitch filter. The time of 0.5 etu after time 115 occurs at time 116, which is likewise delayed from the specified time 114 for the beginning of the error signal. This delay depends on the sampling clock frequency, but can be as long as 0.5 etu for worst case conditions.

Figure 11:
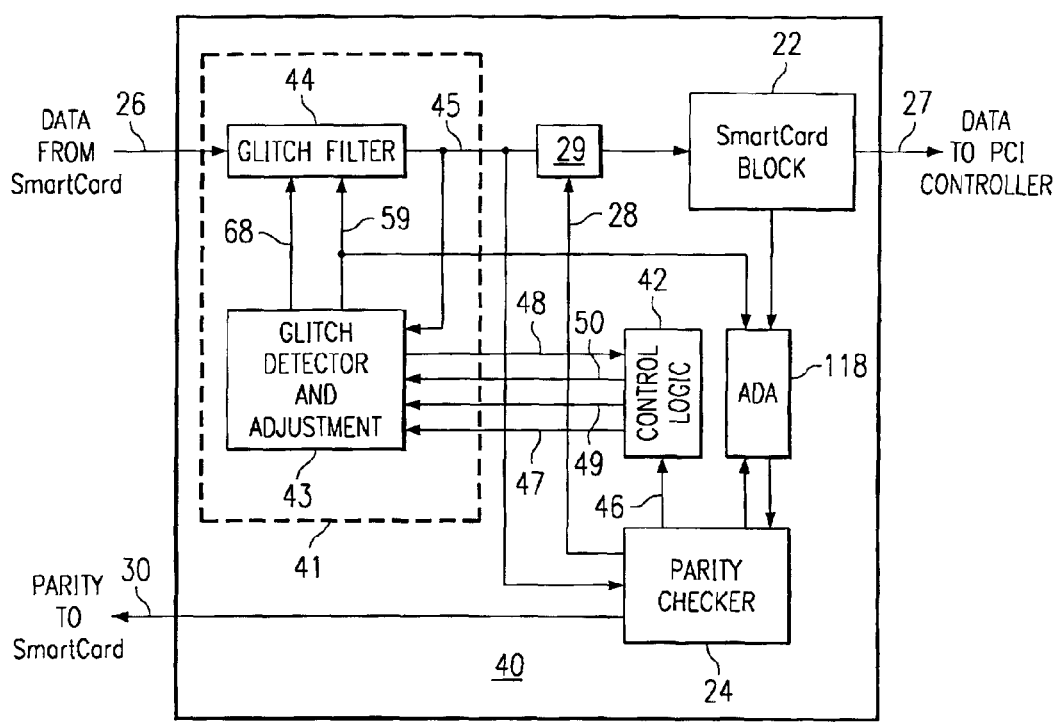
FIG. 11 is a block diagram of a glitch filter like that of FIG. 4, but modified in accordance with the principles of the present invention.

In accordance with the present invention, a method for adjusting the start time of the error signal is provided, in order to align it with the specified time of 10.5+/−0 0.2 etu after the start of the character. FIG. 11 is a block diagram of a preferred embodiment of the present invention. This figure is similar to FIG. 4, but has added to it an automatic delay adjustment block ("ADA") 118 in accordance with a preferred embodiment of the present invention. The ADA 118 receives interface clock rate information from the Smart Card block 22, and receives the value of the filtering glitch width register 63 from the GDA 43. It controls the delay after a parity bit is detected in parity checker block 24, before an error signal is asserted by parity checker block 24. It is capable of providing delay adjustment of up to 0.5 etu. This block may be implemented in hardware, firmware or software, or any combination of the three, but is preferably implemented mostly in firmware to provide a good balance between programmability and speed, and to avoid imposing an additional processing burden on the software.

The principle implemented in the preferred embodiment of the present invention is that a compensation time is subtracted from the absolute delay (after the end of the parity bit) before asserting the error signal, wherein the compensation time is approximately twice the period of a sample clock. This is because, as mentioned above, the delay at a bit transition is approximately twice the delay in one of the MUXes 53, 54, 55, and the MUXes are clocked at the sample frequency. Further, the sample clock is determined by the detected glitch width, with the period of the sample clock being the same as the glitch width. Therefore, the compensation time is determined from the glitch width, specifically the value stored in the filtering glitch width setting register 63. However, it will be recalled that the value in the filtering glitch width setting register 63 is a value converted from a number of interface clock periods to a number of system clock periods, for ease in setting the sample clock, which is derived from the system clock. But, the delay required before asserting the error signal is with respect to interface clock periods, since the delay is 0.5 etu, and the duration of an etu is determined by the interface clock. Therefore, in determining the compensation time the value in the filtering glitch width register 63 is multiplied by two as well as converted from the system clock domain to the interface clock domain.

It will be appreciated that the specific considerations described in the previous paragraph arise from the system to which the present invention is applied, and do not necessarily apply when applying the present invention in other contexts. However, factoring in the considerations in other systems that contribute to the delay to be compensated, in determining the compensation time is well within the skill of ordinary practitioners of this art.

The ADA 118 includes an adjustment counter (not shown), which is a count-down counter having a loadable initial count value, and which counts down to 0 after the data transfer is complete and triggers the start of the error signal. The principle involved is that by controlling the initial value loaded into this counter in accordance with the compensation time described above, the start of the error signal can be adjusted to align substantially with the specified time of 10.5+/−0 0.2 etu after the start of the character. Of course, the timing could be controlled by counting up, in which case the maximum value would be adjusted. But, the count down implementation described herein is considered preferred.

Further, the preferred embodiment utilizes registers to store values involved in the calculation. However, other memory types may be used for this purpose. Since the algorithms used in providing the delay adjustment function can be readily implemented in software, RAM memory may be advantageously used to store those values.

Figure 12:
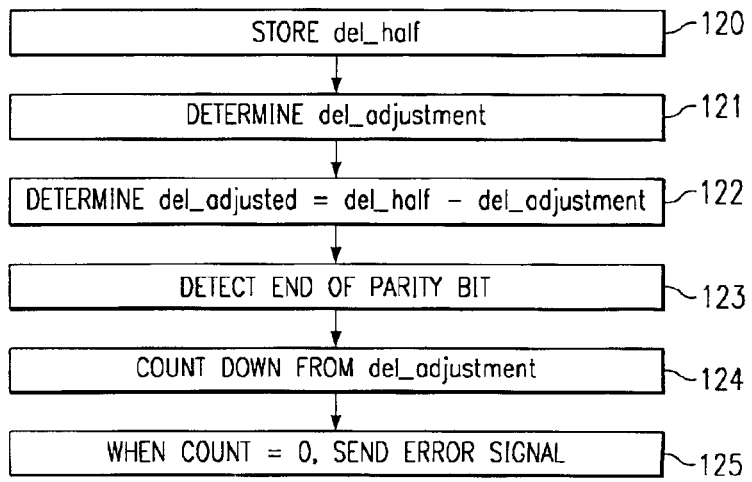
FIG. 12 is a flow chart showing the steps of the preferred embodiment of the present invention.

Referring now to FIG. 12, which shows a flow chart of the method of the preferred embodiment, a value of del_half, equal to a count of 0.5 etu is stored in a register (120). An adjustment value, del_adjustment is determined (121) and subtracted from del_half (122) to provide a count valued that is adjusted to compensate for the delay. When the end of a parity bit is detected (123) a count down from del_adjusted is initiated (124). When the count reaches 0, generation of the error signal is initiated (125).

Specifically, the value of del_adjusted is determined as follows. A start value of del_half, equal to a count of exactly 0.5 etu is stored in a register. The value of del_half depends upon the rate at which the Smart Card interface operates, and is therefore expressed in numbers of interface clock periods. As mentioned above, that rate can be one of five different clock frequencies, 4 MHz, 6 MHz, 8 MHz, 12 MHz and 20 MHz. An adjustment is made to that value to arrive at del_adjusted, which is the initial value stored in the adjustment counter. Thus:

$$\text{del\_adusted} = \text{del\_half} - \text{del\_adjustment}. \qquad \text{Eq. (3)}$$

The value of del_adjustment represents a compensation time for the delay caused by the glitch filter.

As mentioned above, in determining the compensation time the value in the filtering glitch width register 63 is multiplied by two as well as converted from the system clock domain to the interface clock domain. As also mentioned above, the interface clock rate can be one of five different clock frequencies, 4 MHz, 6 MHz, 8 MHz, 12 MHz and 20 MHz. The following Table 2 assists in understanding the conversion implemented, which is different for each interface clock frequency:

TABLE 2

| Clock: | 4 MHz | 6 MHz | 8 MHz | 12 MHz | 16 MHz |
|---|---|---|---|---|---|
| # of SYS clks: | 12 | 8 | 6 | 4 | 3 |
| IF/SYS ratio: | 1/12 | 1/8 | 1/6 | 1/4 | 1/3 |
| Ratio w/2× delay: | 2/12 | 2/8 | 2/6 | 2/4 | 2/3 |
| Delay adj ratio: | 1/6 | 1/4 | 1/3 | 1/2 | 2/3 |
| x: | 6 | 2 | 4 | 1 | 5 |

The first row in Table 2 shows the different interface clock frequencies. The second row shows the number of system clock periods that make up one interface clock period. The third row shows the ratio of an interface clock period to a system clock period, which establishes the time domain conversion factor. The fourth row shows the ratios from the third row multiplied by two, which establishes the actual conversion factor that is multiplied by the value in the filtering glitch width register 63. The fifth row shows the actual conversion factor of the fourth row, reduced to its simplest form. The sixth row shows a number, "x", that is used in the implementation, as described immediately below.

To determine del_adjustment, the following calculations are made, wherein the factor "x" is used in the expression "Time_shift_x". Thus, the expression Time_shift 5, for example, indicates the calculation that is performed to make a conversion when the interface clock is at 16 MHz, i.e., the last row in Table 2. The term, "A" in the calculations below represents the value stored in the filtering glitch width setting register 63. Note that the calculation for Time_shift_3 is for an intermediate quantity used to determine the values of Time_shift_4, 5 and 6, as can be seen below.

$$\text{Time\_shift\_1 is set to } A/2, \quad \text{Eq. (4)}$$

$$\text{Time\_shift\_2 is set to } A/4, \quad \text{Eq. (5)}$$

$$\text{Time\_shift\_3 is set to } A/16, \quad \text{Eq. (6)}$$

These calculations are easily made, since A/2 is determined by a right shift of 1 bit of the value A, A/4 is determined by a right shift of 2 bits of the value of A and A/16 is determined by a right shift of 4 bits of A. Equations (4) though (6) can therefore be implemented simply with net connections, since they need not be changed for a given implementation.

Then, the following calculations are done:

$$\text{Time\_shift\_4} = \text{Time\_shift\_2} + \text{Time\_shift\_3} \quad \text{Eq. (7)}$$

$$\rightarrow A/4 + A/16$$

$$\rightarrow 5A/16$$

$$\rightarrow A/3.2$$

$$\rightarrow A/3,$$

$$\text{Time\_shift\_5} = \text{Left shift of Time\_shift\_4 by one bit} \ (\rightarrow 2A/3) \quad \text{Eq. (8)}$$

$$\text{Time\_shift\_6} = \text{Right shift of Time\_shift\_4 by one bit} \ (\rightarrow A/6) \quad \text{Eq. (9)}$$

where the symbol → refers to the approximate value, since bits may be dropped as the successive calculations are made.

The value of Time_shift_6 is used as the value of del_adjustment. Equation (7) requires one ADD operation, but Equations (8) and (9) only involve bit shifts, and so can be implemented with net connections. Thus, the calculations to determine the delay in the present invention are performed highly efficiently.

As an example, assume an interface clock rate of 4 MHz. Assume that one etu is equal to 50 interface clock periods, and, therefore, del_half has a value of 25 interface clocks. Assume a value of 48 has been stored in the filtering glitch width setting register 63; thus, A has a value of 48. The calculations of Equations (5), (6), (7) and (9) are performed, resulting in the following sequence:

$$\text{Time\_shift\_2} \rightarrow 12 \quad \text{Eq. (5):}$$

$$\text{Time\_shift\_3} \rightarrow 3 \quad \text{Eq. (6):}$$

$$\text{Time\_shift\_4} \rightarrow 15 \quad \text{Eq. (7):}$$

$$\text{Time\_shift\_6} \rightarrow 7 \quad \text{Eq. (9):}$$

Therefore, del_adjustment is set to 7.
Applying Eq. (3) results in:

$$\text{del\_adusted} = \text{del\_half} - \text{del\_adjustment}$$

$$= 25 - 7$$

$$= 18.$$

Thus, the end of a count of 18 interface clock periods from the end of the parity bit occurs at approximately 10.5 etu from the start of the character, within the range set forth in the ISO7816 standard.

The embodiment described above has numerous advantages. For example, it can control the output delay independent of other blocks in the overall Smart Card Interface subunit 40. In addition, it is usable for all clocks used for Smart Card operation. Further, it provides programmable control on the output delay, in implementations in firmware and/or software. Still further, the embodiment is not difficult to implement, and it adjusts the output delay automatically, depending on the value stored in the filtering glitch width setting register 63. Finally, the principles used in the embodiment described above are not limited to the context of Smart Card compliant communication, but are applicable to any circuit and/or system that samples data asynchronously with a greater sampling frequency than the input signal, and in which an input and output delay relationship must be controlled with respect to a reference event in the delayed data.

Therefore, although the present invention and its advantages have been described in detail, it should be understood that various changes, substitutions and alterations can be made herein without departing from the spirit and scope of the invention as defined by the appended claims.

What is claimed is:

1. In a data interface controller receiving asynchronous input data at predetermined one of a plurality of input bit frequencies, wherein the input data is sampled by the interface controller at a sample rate greater than the predetermined input bit rate, and wherein the sample rate is variable, and wherein the interface controller provides output data corresponding to the input data, but delayed by a delay amount that varies in accordance with the sample rate, a method for providing a responsive signal event, responsive to a reference event in the delayed input data and at a predetermined time relative to an input bit time, comprising the steps of:

storing a reference timing number representing the predetermined time in periods of the predetermined input bit frequency;

determining an adjustment number in periods of the predetermined input bit frequency, corresponding to the delay amount;

subtracting the adjustment number from the reference timing value to determine an adjusted timing number;

detecting a reference event in the delayed input data, and in response thereto counting an adjusted timing number of periods of the predetermined input bit frequency; and providing a responsive signal event at the time when the counting has ended.

2. A method according to claim 1, wherein the data interface controller is provided with a reference clock, further comprising the step of:

providing the delay amount in a number of periods of the reference clock;

and wherein the step of determining an adjustment number is performed by:

converting the delay amount from periods of the reference clock to periods of the predetermined input bit frequency; and multiplying the delay amount by a predetermined delay factor determined by the sample rate.

3. A method as in claim 2, wherein the steps of converting and multiplying are performed, at least in part, by one or more bit shifts of the delay amount.

4. A method as in claim 1, wherein the data interface controller is a controller compliant with the ISO7816 standard, and wherein the step of detecting a reference event is performed by detecting the end of a parity bit.

5. A method as in claim 4, wherein the step of providing a responsive signal event is performed by initiating an error signal.

* * * * *